(12) United States Patent
Neubecker et al.

(10) Patent No.: US 11,400,940 B2
(45) Date of Patent: Aug. 2, 2022

(54) CROSSWIND RISK DETERMINATION (71) Applicant: Ford Global Technologies, LLC, Dearborn, MI (US)

(72) Inventors: Cynthia M. Neubecker, Westland, MI (US); Mark Gehrke, Ypsilanti, MI (US); Jonathan Diedrich, Carleton, MI (US); David Hiskens, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 17/034,483

(22) Filed: Sep. 28, 2020

(65) Prior Publication Data

US 2022/0097713 A1 Mar. 31, 2022

(51) Int. Cl.
*B60W 40/02* (2006.01)
*G01P 5/26* (2006.01)

(52) U.S. Cl.
CPC ......... *B60W 40/02* (2013.01); *B60W 2510/20* (2013.01); *B60W 2520/10* (2013.01); *B60W 2555/20* (2020.02)

(58) Field of Classification Search
CPC ............. B60W 40/02; B60W 2555/20; B60W 2510/20; B60W 2520/10; G01P 5/26
See application file for complete search history.

(56) References Cited

U.S. PATENT DOCUMENTS

| | | | | |
|---|---|---|---|---|
| 10,228,696 B2* | 3/2019 | Myers | ................... | B60W 40/02 |
| 2015/0039183 A1* | 2/2015 | Yang | ........................ | B62D 6/04 |
| | | | | 701/42 |
| 2017/0197656 A1* | 7/2017 | Oh | ......................... | B62D 6/007 |
| 2017/0352276 A1* | 12/2017 | Arndt | ................... | G08G 1/0141 |
| 2018/0162400 A1* | 6/2018 | Abdar | .................. | G08G 1/0129 |
| 2018/0210447 A1* | 7/2018 | Myers | .................. | B60W 50/14 |
| 2018/0211520 A1* | 7/2018 | Offenhaeuser | ....... | G08G 1/0141 |
| 2018/0292823 A1* | 10/2018 | Wei | ....................... | G05D 1/0088 |
| 2019/0204833 A1* | 7/2019 | Wei | ....................... | G01S 7/4802 |
| 2019/0233101 A1* | 8/2019 | Schwindt | ............... | G06V 20/13 |
| 2019/0250274 A1* | 8/2019 | Ito | ........................... | G01S 17/58 |
| 2019/0383638 A1* | 12/2019 | Cho | ..................... | G05D 1/0295 |
| 2020/0124765 A1* | 4/2020 | Nishimura | .............. | H04W 4/38 |
| 2020/0156623 A1* | 5/2020 | Takaue | ................... | B60K 23/04 |
| 2020/0236521 A1* | 7/2020 | Vassilovski | .......... | G08B 25/016 |
| 2020/0317266 A1* | 10/2020 | Kunihiro | .............. | B62D 15/029 |
| 2020/0380787 A1* | 12/2020 | Croxford | .............. | G06T 19/006 |

(Continued)

FOREIGN PATENT DOCUMENTS

CN 204116380 U 1/2015
DE 102008062752 A1 6/2010
(Continued)

*Primary Examiner* — Fadey S. Jabr
*Assistant Examiner* — Naeem Taslim Alam
(74) *Attorney, Agent, or Firm* — Frank Lollo; Bejin Bieneman PLC (57) ABSTRACT

Real-time wind data for a location is determined based on a detected movement of an object relative to a vehicle. The real-time wind data includes a wind speed and a wind direction. Upon receiving stored wind data for the location from a remote computer, a crosswind risk is determined based on the real-time wind data and the stored wind data. A vehicle component is actuated to compensate for the crosswind risk.

20 Claims, 4 Drawing Sheets

(56) References Cited

U.S. PATENT DOCUMENTS

2020/0394907 A1* 12/2020 Takamori ............. B60W 40/02
2021/0048310 A1*  2/2021 George .............. G01C 21/3694
2021/0197837 A1*  7/2021 Grubwinkier ............. G01P 5/00

FOREIGN PATENT DOCUMENTS

JP       2017170921 A    9/2017
KR       101545054 B1    8/2015

* cited by examiner

CROSSWIND RISK DETERMINATION

BACKGROUND

Vehicles, such as autonomous or semi-autonomous vehicles, typically include a variety of sensors. The sensors can be placed on or in various parts of the vehicle, e.g., a vehicle roof, a vehicle hood, a rear vehicle door, etc. Some sensors detect the external world, for example, radar sensors, scanning laser range finders, light detection and ranging (LIDAR) devices, and image processing sensors such as cameras. Operation of the vehicle can rely upon acquiring accurate and timely data regarding the vehicle's environment while the vehicle is being operated.

DETAILED DESCRIPTION

A system includes a computer including a processor and a memory, the memory storing instructions executable by the processor to determine real-time wind data for a location based on a detected movement of an object relative to a vehicle. The real-time wind data includes a wind speed and a wind direction. The instructions further include instructions to, upon receiving stored wind data for the location from a remote computer, determine a crosswind risk based on the real-time wind data and the stored wind data. The instructions further include instructions to actuate a vehicle component to compensate for the crosswind risk.

The instructions can further include instructions to provide the crosswind risk and the real-time wind data to the remote computer.

The remote computer can include a second processor and a second memory. The second memory can store instructions executable by the second processor to update the stored wind data based on the crosswind risk and the real-time wind data.

The instructions can further include instructions to input image data obtained by one or more sensors on the vehicle to a machine learning program and to obtain the real-time wind data as output from the machine learning program.

The instructions can further include instructions to determine the real-time wind data additionally based on weather data for an area, wherein the location is within the area.

The instructions can further include instructions to determine the real-time wind data additionally based on steering data for the vehicle.

The instructions can further include instructions to determine the crosswind risk additionally based on a speed of the vehicle.

The instructions can further include instructions to determine the real-time wind data additionally based on an orientation of the object relative to a ground surface.

The instructions can further include instructions to provide location data of the vehicle to the remote computer.

The instructions can further include instructions to determine movement of the object based on optical flow imaging.

A method includes determining real-time wind data for a location based on a detected movement of an object relative to a vehicle. The real-time wind data includes a wind speed and a wind direction. The method further includes, upon receiving stored wind data for the location from a remote computer, determining a crosswind risk based on the real-time wind data and the stored wind data. The method further includes actuating a vehicle component to compensate for the crosswind risk.

The method can further include providing the crosswind risk and the real-time wind data to the remote computer.

The method can further include updating, in the remote computer, the stored wind data based on the crosswind risk and the real-time wind data.

The method can further include inputting image data obtained by one or more sensors on the vehicle to a machine learning program and to obtain the real-time wind data as output from the machine learning program.

The method can further include determining the real-time wind data additionally based on weather data for an area, wherein the location is within the area.

The method can further include determining the real-time wind data additionally based on steering data for the vehicle.

The method can further include determining the crosswind risk additionally based on a speed of the vehicle.

The method can further include determining the real-time wind data additionally based on an orientation of the object relative to a ground surface.

The method can further include providing location data of the vehicle to the remote computer.

The method can further include determining movement of the object based on optical flow imaging.

Further disclosed herein is a computing device programmed to execute any of the above method steps. Yet further disclosed herein is a computer program product, including a computer readable medium storing instructions executable by a computer processor, to execute an of the above method steps.

A crosswind can act on a vehicle, e.g., causing the vehicle to deviate from a planned path and/or causing a vehicle to expend energy to maintain a planned path. A vehicle computer can receive stored wind data from a remote computer for an area in which the vehicle is traveling Even if data is available from a remote computer, e.g., a server providing current weather data for an area in which a vehicle is traveling, including data about windspeed and direction, a vehicle computer may be unable to determine wind data for a location of the vehicle within the area with sufficient specificity for vehicle operations. Therefore, advantageously as described herein, the vehicle computer can be programmed to determine real-time wind data for the location of the vehicle, i.e., the environment around the vehicle and within fields of view of vehicle sensors, based on sensor data. Then, the vehicle computer can determine a crosswind risk based on the real-time wind data and possibly also the stored wind data, and can actuate a vehicle component based on the crosswind risk. Actuating the vehicle component based on the crosswind risk may compensate for the forces acting on the vehicle from the crosswind, which can prevent the crosswind from causing the vehicle to deviate from a planned path.

Figure 1:
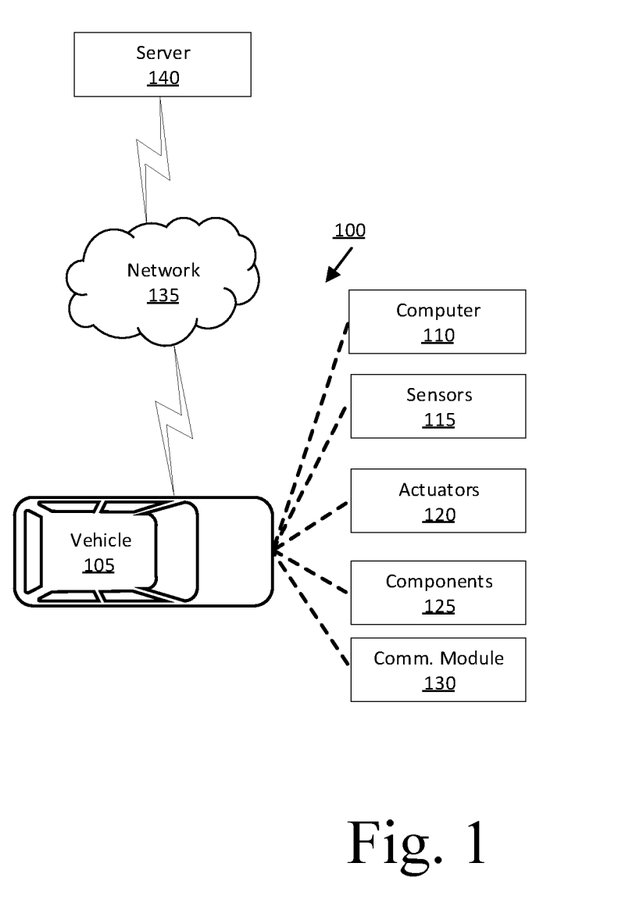
FIG. 1 is a block diagram illustrating an example vehicle control system for a vehicle.
Figure 2:
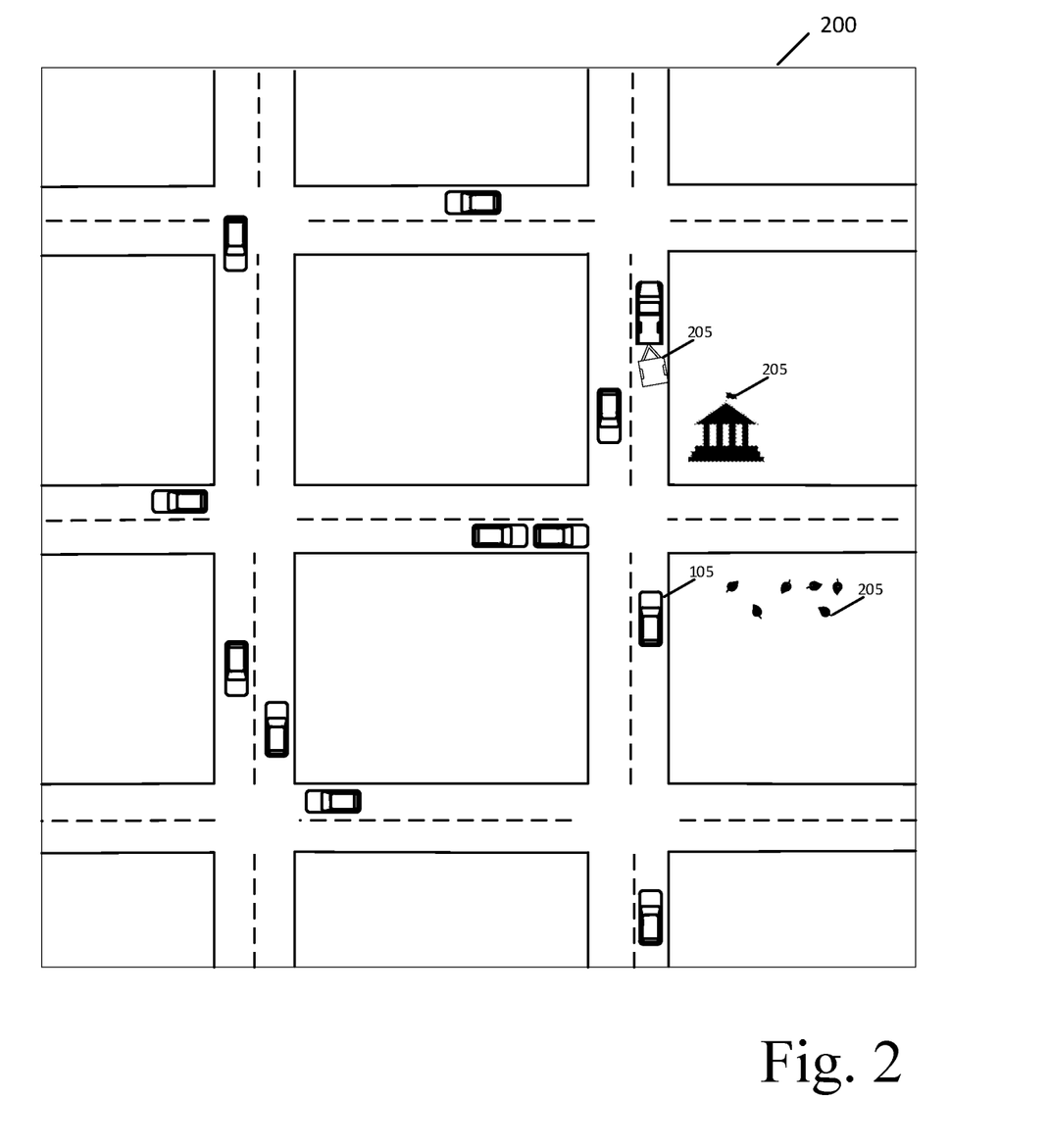
FIG. 2 is a diagram illustrating operating a vehicle according to the system of FIG. 1.

With reference to FIGS. 1-2, an example vehicle control system 100 includes a vehicle 105. A vehicle computer 110 in the vehicle 105 receives data from sensors 115. The vehicle computer 110 is programmed to determine real-time wind data for a location based on a detected movement of an object 205 relative to the vehicle 105. The real-time wind data includes a wind speed and a wind direction. The vehicle computer 110 is further programmed to, upon receiving stored wind data for the location from a remote server computer 140, determine a crosswind risk based on the real-time wind data and the stored wind data. The vehicle computer 110 is further programmed to actuate a vehicle component 125 to compensate for the crosswind risk.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a server 140 and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of one or more objects 205 surrounding the vehicle 105. As another example, one or more radar sensors 115 fixed to vehicle 105 bumpers may provide data to provide locations of one or more objects 205 relative to the location of the vehicle 105. The sensors 115 may further alternatively or additionally, for example, include camera sensor(s) 115, e.g. front view, side view, etc., providing images from an area 200 surrounding the vehicle 105. In the context of this disclosure, an object 205 is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object 205, e.g., a vehicle, a sign, a tree, a flag, debris, etc., relative to the vehicle 105. As one example, the data may be image data of the environment around the vehicle 105. In such an example, the image data may include one or more objects 205. Image data herein means digital image data, e.g., comprising pixels with intensity and color values, that can be acquired by camera sensors 115, which can detect visible light, infrared radiation, ultraviolet light, etc. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a server 140 (typically via direct radio frequency communications). The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 140 can be a conventional computing device, i.e., including one or more processors and one or more memories, programmed to provide operations such as disclosed herein. Further, the server 140 can be accessed via the network 135, e.g., the Internet, a cellular network, and/or some other wide area network.

Turning now to FIG. 2, a vehicle 105 is illustrated operating in an example area 200. An area 200 is a geographic area with defined boundaries, e.g., by geo-fencing. In such an example, the geo-fence specifies a perimeter of the area 200 according to geo-coordinates, e.g., such as are used in the Global Positioning System (GPS) that specify lines defining boundaries, i.e., the perimeter, of the area 200. The vehicle computer 110 can then determine the vehicle 105 is within the area 200 based on the location data of the vehicle 105 indicating the vehicle 105 is within the geo-fence. The vehicle computer 110 may be programmed to transmit the location data of the vehicle 105 to the remote server computer 140, e.g., via the network 135.

The vehicle computer 110 can, for example, generate a planned path to operate the vehicle 105 in the area 200, e.g., along one or more roads. Alternatively, the server 150 can generate the planned path and provide the planned path to the vehicle computer 110, e.g., via the network 135. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation speed and acceleration including positions in x, y, z, yaw, pitch, roll, yaw rate, pitch rate, roll rate, heading velocity and heading acceleration that can be determined by fitting a polynomial function to successive 2D locations included in vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \qquad (1)$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

While operating in the area 200, the vehicle computer 110 can receive sensor 115 data, e.g., image data, of the environment around the vehicle 105 in the area 200. The image data can include one or more objects 205 in the area 200 around the vehicle 105. For example, object classification or identification techniques, can be used, e.g., in the vehicle computer 110 based on lidar sensor 115, camera sensor 115, etc., data to identify a type of object, e.g., a vehicle, a trailer, a flag, a tree, a traffic signal, leaves, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the vehicle 105 can be used to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 is programmed to determine real-time wind data for the location of the vehicle 105. The vehicle computer 110 can, for example, determine the real-time wind data for the location of the vehicle 105 based on one of movement of an object 205 (as discussed below), an orientation of an object 205 (as discussed below), vehicle component 125 data (as discussed below), or weather data (as discussed below). For example, the vehicle computer 110 may determine the real-time wind data is the real-time wind data determined based on the movement of an object 205, e.g., a flag, a trailer, a tree, leaves, a traffic signal, etc., as discussed below.

Alternatively, the vehicle computer 110 can determine the real-time wind data by combining the real-time wind data determined based on at least two of movement of the object 205, the orientation of the object 205, vehicle component 125 data, and weather data (e.g., by averaging and/or using some other statistical measure). That is, the real-time wind data may be a function, e.g., an average, a weighted sum, a weighted product, etc., of the real-time wind data determined based on any combination of movement of the object 205, an orientation of the object 205, vehicle component 125 data, and weather data. For example, the real-time wind data can be a function of the real-time wind data determined based on each of movement of the object 205, the orientation of the object 205, vehicle component 125 data, and weather data.

$$R(\text{speed, direction}) = w_1 M(\text{speed, direction}) + w_2 O(\text{speed, direction}) + w_3 C(\text{speed, direction}) + w_4 W(\text{speed, direction}) \quad (2)$$

where R(speed, direction) is the real-time wind data, M(speed, direction) is the real-time wind data determined based on movement of the object 205, O(speed, direction) is the real-time wind data determined based on the orientation of the object 205, C(speed, direction) is the real-time wind data determined based on vehicle component 125 data, W(speed, direction) is the real-time wind data determined based on the weather data, and $w_1$, $w_2$, $w_3$, and $w_4$ are weights, e.g., between 0 and 1. The weights $w_1$, $w_2$, $w_3$, $w_4$ may be predetermined based on empirical testing of wind data for an area 200 under specific conditions such as time of day, time of year, etc.

As set forth above, the vehicle computer 110 can determine real-time wind data for a location based on movement of one or more objects 205 relative to the vehicle 105. Upon identifying an object 205 (as discussed above, the vehicle computer 110 can, for example, determine movement of the object 205 relative to the vehicle 105 based on sensor 115 data, e.g., image data. For example, the vehicle computer 110 can, via optical flow imaging techniques, generate an optical flow image based on image data from one or more sensors 115. An optical flow image includes image data determined by calculating optical flow, which measures the change in image pixel location data between two or more images. Optical flow is defined as the apparent motion of an object 205 caused by relative motion between a sensor 115 acquiring images of the object 205 and the object 205. Optical flow calculations are performed by locating image features in a first image and comparing the locations with locations of corresponding image features in a second image. An image feature can be any arrangement of pixel data that can be located in two or more images. For example, edges produced by changes in pixel values, e.g., edges of an object 205, can be used to identify an image feature. The change in image feature locations between the two images is a function of the change in a six-axis pose (location and orientation) of the sensor 115 between acquisitions of the two images and the location of the image feature in the real world environment.

One technique for determining image feature locations is to select a contiguous region of pixels having a first location in a first image and to then use the selected region as a kernel to determine a second location with a highest correlation coefficient in a second image. The second location with the highest correlation coefficient in the second image is deemed to correspond to the first location. Determination of optical flow depends upon selecting image regions that do not substantially change appearance from a first image to a second image but do change location due to movement of the object 205 between first and second images. The time between acquiring first and second images can be selected to minimize changes in the appearance of image regions due to changes in perspective and occlusion while maximizing changes in region location due to object 205 movement. The time step between acquiring the first and second images can be any suitable number of frames, where a frame time step is the length of time required to acquire a single image.

The vehicle computer 110 can then input sensor 115 data, e.g., image data, such as the optical flow image, radar data, lidar data, etc., into a neural network, such as a Deep Neural Network (DNN) (see FIG. 3), that can be trained to accept image data for movement of an object 205, e.g., a flag, a trailer, leaves, a tree, a traffic signal, etc., as input and generate an output identifying real-time wind data for a location of the vehicle 105.

As set forth above, the vehicle computer 110 can determine the real-time wind data based on an orientation of the object 205 relative to a ground surface, e.g., a road. The vehicle computer 110 can determine the orientation of the object 205 based on sensor 115 data, e.g., image data. For example, the vehicle computer 110 can, e.g., using image processing techniques, determine, from the image, an angle between an axis extending orthogonally to the ground surface and a longitudinal axis of the object 205 that intersects the axis and the ground surface. The vehicle computer 110 can determine the real-rime wind data based on the angle.

The vehicle computer 110 can determine the wind direction based on a direction of the angle determined from the axis to the longitudinal axis of the object 205. For example, when the direction of the angle is clockwise, i.e., to the left of the axis in an image of an object 205 in front of the vehicle 105, the vehicle computer 110 can determine that the wind direction is from a right side of the vehicle 105 to a left side of the vehicle 105. As another example, when the direction of the angle is counterclockwise, i.e., to the right of the axis in an image of an object 205 in front of the vehicle 105, the vehicle computer 110 can determine that the wind direction is from a left side of the vehicle 105 to a right side of the vehicle 105.

The vehicle computer 110 can determine the wind speed based on a size of the angle. For example, vehicle computer 110 can select a wind speed from a plurality of wind speeds, e.g., stored in a look-up table or the like, corresponding to angle sizes. The look-up table may be stored in a memory of the vehicle computer 110. The wind speed may be determined empirically, e.g., by making multiple measurements of the movement of various objects caused by various wind speeds.

As set forth above, the vehicle computer 110 can determine real-time wind data based on vehicle component 125 sensor 115 data. For example, the vehicle 105 may include various sensors 115 that collect data specifying performance of one or more vehicle components 125. The sensors 115 can then provide the vehicle component 125 data to the vehicle computer 110, e.g., via the vehicle network.

The vehicle computer 110 can determine the real-time wind data based on the vehicle component 125 data. For example, the vehicle computer 110 can receive, from a steering wheel sensor, steering data specifying a steering wheel angle. The vehicle computer 110 can then determine the real-time wind data based on the steering wheel angle. For example, the vehicle computer 110 can compare the steering wheel angle to a neutral position (i.e., a position of the steering wheel that causes the vehicle 105 to operate in a straight line) to determine a steering wheel angle direction (e.g., clockwise or counterclockwise) and a steering wheel angle size relative to the neutral position.

The vehicle computer 110 can determine the real-time wind direction based on the steering wheel angle direction, i.e., a direction of rotation of the steering wheel. The vehicle computer 110 can determine the direction of the wind is in a same direction as the steering wheel angle direction. That is, the vehicle computer 110 can determine the wind is pushing the vehicle 105 away from the planned path, which rotates the steering wheel. For example, when the steering wheel angle is clockwise relative to the neutral position, the vehicle computer 110 can determine that the real-time wind direction is from a left side to a right side of the vehicle 105. As another example, when the steering wheel angle is counterclockwise relative to the neutral position, the vehicle computer 110 can determine the real-time wind direction is from the right side to the left side of the vehicle 105.

The vehicle computer 110 can determine the real-time wind speed based on the steering wheel angle size. For example, vehicle computer 110 can select a real-time wind speed from a plurality of wind speeds, e.g., stored in a look-up table, or the like, corresponding to steering wheel angle sizes. The look-up table may be stored in a memory of the vehicle computer 110. The real-time wind speed may be determined empirically, e.g., by making multiple measurements of steering wheel rotation caused by various wind speeds.

As set forth above, the vehicle computer 110 can determine the real-time wind data based on weather data for the area 200. For example, the vehicle computer 110 can receive weather data for the area 200 from the remote server computer 140, e.g., via the network 135. The weather data may be in a known form, e.g., ambient air temperature, ambient humidity, precipitation information, forecasts, wind speed, etc. That is, the weather data may specify a wind speed and a wind direction in addition to other physical phenomenon in an ambient environment, e.g., an air temperature, an amount of ambient light, a presence or absence of precipitation, a type of precipitation (e.g., snow, rain, etc.), an amount of precipitation (e.g., a volume or depth of precipitation being received per unit of time, e.g., amount of rain per minute or hour), presence or absence of atmospheric occlusions that can affect visibility, e.g., fog, smoke, dust, smog, a level of visibility (e.g., on a scale of 0 to 1, 0 being no visibility and 1 being unoccluded visibility), etc.

As another example, the vehicle computer 110 can analyze image data, e.g., using image processing techniques, to determine the weather data for the area 200 in real-time. In such an example, the vehicle computer 110 can then provide the real-time weather data for the area 200 to the remote server computer 140. For example, the vehicle computer 110 can transmit the real-time weather data to the remote server computer 140, e.g., via the network 135. The remote server computer 140 can then update the weather data for the area 200 based on crowdsourced data (as discussed below). That is, the remote server computer 140 can combine (e.g., by averaging and/or using some other statistical measure) measures included in the real-time weather data and the stored weather data, e.g., wind speeds. The remote server computer 140 can then store the updated weather data, e.g., in a memory of the remote server computer 140.

The vehicle computer 110 can receive stored wind data for the area 220 from the remote server computer 140. That is, upon receiving the location of the vehicle 105, the remote server computer 140 can respond by transmitting the stored wind data to the vehicle computer 110, e.g., via the network 135. The remote server computer 140 can store, e.g., in a memory of the remote server computer 140, wind data received from a plurality of vehicles operating at the location. That is, the stored wind data may be crowdsourced data. Crowdsourced data means having a plurality of vehicles provide wind data independently of one another and then combining (e.g., by averaging and/or using some other statistical measure) the results.

Upon determining the real-time wind data, the vehicle computer 110 can determine a crosswind risk based on the real-time wind data and stored wind data. As used herein, a "crosswind risk" is a number, typically a scalar value, e.g., between 0 and 1, that the vehicle computer 110 can use to determine a severity of a crosswind acting on the vehicle 105. A crosswind is a wind direction substantially parallel to a lateral axis of the vehicle 105, i.e., substantially orthogonal to a direction of travel of the vehicle 105.

The vehicle computer 110 can determine whether the real-time wind direction represents a crosswind based on the real-time wind data and the stored wind data. For example, the vehicle computer 110 can use Bayes' Theorem for Conditional Probability to determine a probability of a crosswind based on the real-time wind direction and the stored wind direction.

$$P(\text{Crosswind}) = \frac{P(\text{Real} \mid \text{Stored}) P(\text{Stored})}{P(\text{Stored} \mid \text{Real Wind})} \quad (3)$$

where P(Real Wind | Stored Wind) represents the probability of whether the real-time wind direction represents a crosswind given the stored wind direction, P(Stored Wind) represents the probability of the stored wind direction represents a crosswind, and P(Stored Wind | Real Wind) represents the probability of whether the stored wind direction represents a crosswind given the real-time wind direction.

The vehicle computer 110 can then compare P(Crosswind) to a probability threshold, e.g., stored in a memory of the vehicle computer 110. The probability threshold may be determined empirically, e.g., by taking many measurements of wind direction for an area 200. When P(Crosswind) is less than or equal to the probability threshold, the vehicle computer 110 determines the real-time wind direction does not represent a crosswind. In such an example, the vehicle computer 110 can determine the crosswind risk is null, e.g., 0. When P(Crosswind) is greater than or equal to the probability threshold, the vehicle computer 110 determines the real-time wind direction represents a crosswind.

Figure 3:
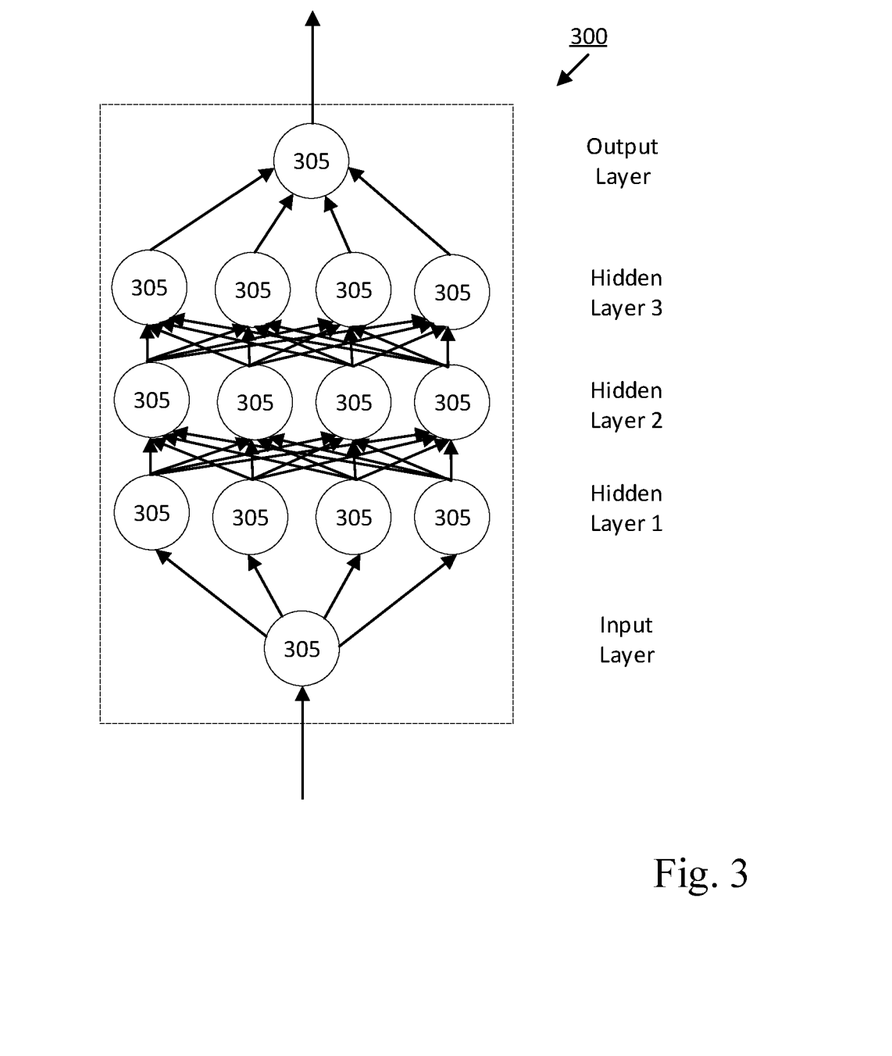
FIG. 3 is an example diagram of a deep neural network.

Upon determining the real-time wind data represents a crosswind, the vehicle computer 110 can determine the crosswind risk based on the real-time wind speed. For example, the vehicle computer 110 can select a crosswind risk from a plurality of crosswind risks, e.g., stored in a look-up table or the like, corresponding to real-time wind speed. An example look-up table is shown below (see Table 1). The look-up table may be stored in a memory of the vehicle computer 110. The crosswind risk may be determined empirically, e.g., by detecting objects via image data and processing the image data with the DNN 300 to, upon satisfying a stored data test, determine a crosswind risk which directly correlates to a crosswind speed.

TABLE 1

| Crosswind Risk | Wind Speed Threshold |
| --- | --- |
| 0.1 | Wind Speed ≤ 5 miles per hour (mph) |
| 0.2 | 5 mph < Wind Speed ≤ 10 mph |
| 0.3 | 10 mph < Wind Speed ≤ 15 mph |
| 0.4 | 15 mph < Wind Speed ≤ 20 mph |
| 0.5 | 20 mph < Wind Speed ≤ 25 mph |
| 0.6 | 25 mph < Wind Speed ≤ 30 mph |
| 0.7 | 30 mph < Wind Speed ≤ 35 mph |
| 0.8 | 35 mph < Wind Speed ≤ 40 mph |
| 0.9 | 40 mph < Wind Speed ≤ 45 mph |
| 1.0 | 45 mph < Wind Speed |

Table 1 illustrates that the crosswind risk may be at least in part proportional to the real-time wind speed. That is, the crosswind risk may increase as the real-time wind speed increases. In such an example, the vehicle computer 110 can compare the real-time wind speed to at least one risk threshold, e.g., stored in the memory of the vehicle computer 110. The vehicle computer 110 can then determine one crosswind risk, e.g., 0.4, based on the real-time wind speed being less than or equal to the at least one risk threshold or another crosswind risk, e.g., 0.5, based on the real-time wind speed being greater than the at least one risk threshold.

Alternatively, the vehicle computer 110 can determine the crosswind risk based on a speed of the vehicle 105 and the real-time wind speed. The vehicle computer 110 can determine the speed of the vehicle 105 based on sensor 115 data, e.g., wheel speed sensor data. The vehicle computer 110 may determine the crosswind risk as a function, e.g., a weight sum, a weighted product, etc., of the speed of the vehicle and the real-time wind speed.

$$C_r = w_5 V_s + w_6 M_s \quad (4)$$

where $C_r$ is the crosswind risk, $V_s$ is the vehicle speed, $R_s$ is the real-time wind speed, and $w_5$ and $w_6$ are weights, e.g., between 0 and 1. The weights $w_5$, $w_6$ may be predetermined based on empirical testing of the lateral movement of a vehicle operating at various speeds and subjected to various crosswind speeds, e.g., by positioning the vehicle an various angles relative to a direction of wind in a wind tunnel and using, e.g., an inertial measurement units (IMU), laser metrology, etc., to determine movement of the vehicle in the wind tunnel when being subjected to various wind speeds.

As another example, the vehicle computer 110 can store a plurality of look-up tables, e.g., in the memory of the vehicle computer 110, each associated with one respective vehicle 105 speed. Each of the look-up tables includes a plurality of crosswind risks corresponding to real-time wind speeds for the specified vehicle 105 speed. Upon determining the speed of the vehicle 105, the vehicle computer 110 can select the look-up table associated with the speed of the vehicle 105. The vehicle computer 110 can then determine the crosswind risk based on the real-time wind speed and the look-up table.

Upon determining the crosswind risk, the vehicle computer 110 can actuate a human-machine interface (HMI) that includes output devices such as speakers and displays, e.g., a touchscreen display, that outputs the message to a user. The HMI is coupled to the vehicle communications network and can send and/or receive messages to/from the vehicle computer 110 and other vehicle sub-systems. The HMI can output a cue specifying the crosswind risk and/or suggested actions for a user of the vehicle given the crosswind risk. The cue can be an audio cue, e.g., a message or tone specifying the crosswind risk, or a visual cue, e.g., visual message or lights specifying the crosswind risk.

Additionally, or alternatively, the vehicle computer 110 can actuate one or more vehicle components 125 to compensate for the crosswind risk. For example, the vehicle computer 110 can apply a torque to a steering wheel to rotate the steering wheel to maintain the vehicle 105 on a planned path in the presence of the crosswind. Additionally, or alternatively, the vehicle computer 110 can actuate a brake to reduce the speed of the vehicle 105, which can reduce the crosswind risk. In such an example, the vehicle computer 110 can actuate the brake until the crosswind risk is below a specified number, e.g., stored in a memory of the vehicle computer 110. The vehicle computer 110 can actuate one or more vehicle components 125 to compensate for the crosswind risk based on a look-up table, e.g., stored in the memory of the vehicle computer 110, corresponding to crosswind risk values. That is, the look-up table may specify the actuation of one or more vehicle components 125, including amounts of actuation, e.g., steering wheel torque, brake force, etc., associated with each crosswind risk value, typically in combination with a vehicle speed or range of speeds. Upon determining the crosswind risk, the vehicle computer 110 can determine the one or more vehicle components 125 to actuate based on the look-up table specifying the amount of actuation for the component(s) 125 for the determined crosswind risk and current vehicle 105 speed.

The vehicle computer 110 can provide the real-time wind data and the crosswind risk to the remote server computer 140, e.g., via the network 135. The remote server computer 140 can then update stored wind data based on crowd-sourced data (as discussed above). That is, the remote server computer 140 can combine (e.g., by averaging and/or using some other statistical measure) the real-time wind data and the crosswind risk with the stored wind data. The remote server computer 140 can then store the updated wind data, e.g., in a memory of the remote server computer 140.

FIG. 3 is a diagram of an example deep neural network (DNN) 300 that can be trained to identify real-time wind data for a location based on sensor 115 data from the vehicle 105. The DNN 300 can be a software program that can be loaded in memory and executed by a processor included in a computer, for example. In an example implementation, the DNN 300 can include, but is not limited to, a convolutional neural network (CNN), R-CNN (Region-based CNN), Fast R-CNN, and Faster R-CNN. The DNN includes multiple nodes, and the nodes are arranged so that the DNN 300 includes an input layer, one or more hidden layers, and an output layer. Each layer of the DNN 300 can include a plurality of nodes 305. While FIG. 3 illustrate three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to an activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

As one example, the DNN 300 can be trained with ground truth data, i.e., data about a real-world condition or state. For example, the DNN 300 can be trained with ground truth data and/or updated with additional data by a processor of the remote computer 150. Weights can be initialized by using a Gaussian distribution, for example, and a bias for each node 305 can be set to zero. Training the DNN 300 can include updating weights and biases via suitable techniques such as back-propagation with optimizations. Ground truth data can include, but is not limited to, data specifying objects, e.g., vehicles, pedestrians, etc., within an image or data specifying a physical parameter. For example, the ground truth data may be data representing objects and object labels. In another example, the ground truth data may be data representing an object, e.g., a vehicle, and a relative angle and/or speed of the object, e.g., the vehicle, with respect to another object, e.g., a pedestrian, another vehicle, etc.

During operation, the vehicle computer 110 can obtain sensor 115 data including one or more objects 205 in the environment around the vehicle 105 (as discussed above) and provides the sensor 115 data to the DNN 300. The DNN 300 outputs a prediction based on the received input. The DNN 300 output is a predicted wind state, e.g., wind speed and wind direction, for a location of the vehicle 105.

Figure 4:
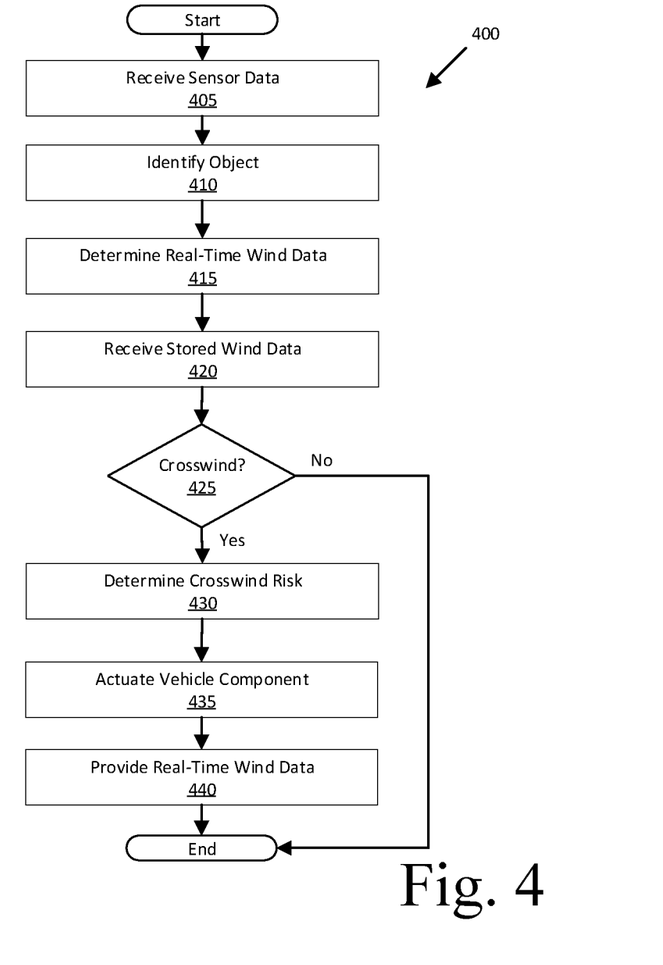
FIG. 4 is a flowchart of an example process for determining a crosswind risk.

FIG. 4 is a diagram of an example process 400 for determining a crosswind risk while operating a vehicle 105. The process 400 begins in a block 405. The process 400 can be carried out by a vehicle computer 110 included in the vehicle 105 executing program instructions stored in a memory thereof.

In the block 405, the vehicle computer 110 receives data from one or more sensors 115 and/or from a remote server computer 140. For example, the vehicle computer 110 can receive location data of the vehicle 105, e.g., from a sensor 115, a navigation system, etc. Additionally, the vehicle computer 110 can receive image data, e.g., from one or more image sensors 115. The image data may include data about the environment around the vehicle 105, e.g., one or more objects 205, another vehicle, pedestrians, etc. The process 400 continues in a block 410.

In the block 410, the vehicle computer 110 identifies one or more objects 205. The vehicle computer 110 can identify the object(s) 205 based on sensor 115 data. For example, the vehicle computer 110 can input image data into a classifier trained to output an identification of a type of object 205, e.g., a trailer, a flag, a tree, a traffic signal, leaves, etc., as discussed above. The process 400 continues in a block 415.

In the block 415, the vehicle computer 110 determines real-time wind data for the location. The vehicle computer 110 can determine real-time wind data for the location based on at least one of movement of the object 205 relative to the vehicle 105, an orientation of the object 205 relative to a ground surface, vehicle component 125 data, and weather data, as discussed above. For example, the vehicle computer 110 can determine the real-time wind data is the real-time wind data determined based on one of movement of the object 205, an orientation of the object 205, vehicle component 125 data, or the weather data.

Alternatively, the vehicle computer 110 can combine the real-time wind data determined based on at least two of movement of the object 205, the orientation of the object 205, vehicle component 125 data, and the weather data (e.g., by averaging and/or using some other statistical measure) to determine the real-time wind data. That is, the real-time wind data may be a function, e.g., an average, a weighted sum, a weighted product, etc., of the real-time wind data determined based on movement of the object 205, the wind data determined based on an orientation of the object 205, the wind data determined based on vehicle component 125 data, the wind data specified by the weather data, or any combination thereof.

The vehicle computer 110 can determine movement of the object 205 based on sensor 115 data. For example, the vehicle computer 110 can generate an optical flow image, e.g., using optical flowing imaging techniques, from a first image and a second image, as discussed above. The vehicle computer 110 can then input the optical flow image into a DNN 300. In such an example, the DNN 300 outputs real-time wind data for the location.

The vehicle computer 110 can determine the orientation of the object 205 based on sensor 115 data, e.g., image data, as discussed above. That is, the vehicle computer 110 determines a direction and a size of an angle between an axis extending orthogonal to the ground surface and a longitudinal axis of the object 205 that intersects the axis and the ground surface. The vehicle computer 110 can then determine the real-time wind data, e.g., the real-time wind speed and the real-time wind direction, based on the direction and size of the angle, as discussed above.

The vehicle computer 110 can receive vehicle component 125 data, e.g., via the vehicle communication network, from various sensors 115 that collect data specifying performance of one or more vehicle components 125. For example, the vehicle computer 110 can determine a wind speed and a wind direction by comparing a steering wheel angle to a neutral position, as discussed above.

The vehicle computer 110 can receive the weather data, i.e., data providing physical measurements of an ambient environment, for an area 200 from the remote server computer 140, e.g., via the network 135. The weather data typically includes conventional values, e.g., ambient air temperature, ambient humidity, precipitation information, forecasts, etc. The weather data can specify wind data for the area 200 in addition to other physical phenomenon in an ambient environment. The process 400 continues in a block 420.

In the block 420, the vehicle computer 110 receives stored wind data from the remote server computer 140, e.g., via the network 135. The remote server computer 140 can determine the stored wind data based on crowdsourced data, as discussed above. The process 400 continues in a block 425.

In the block 425, the vehicle computer 110 determines whether the real-time wind data represents a crosswind. As set forth above, a crosswind is a wind flow generally parallel to a lateral axis of the vehicle 105. The vehicle computer 110 can, for example, use Bayes' Theorem to determine a probability of a crosswind based on the real-time wind data and the stored wind data. If the vehicle computer 110 determines the real-time wind data represents a crosswind, then the process 400 continues in a block 430. Otherwise, the process 400 ends.

In the block 430, the vehicle computer 110 determines the crosswind risk. For example, the vehicle computer 110 can determine the crosswind risk based on the real-time wind speed and a look-up table, as discussed above. Alternatively, the vehicle computer 110 can determine the crosswind risk based on the real-time wind speed and a speed of the vehicle 105. For example, the vehicle computer 110 can combine the real-time wind speed and the speed of the vehicle 105 (e.g., by averaging and/or some other statistical measure), as discussed above. That is, the crosswind risk may be a function of the real-time wind speed and the speed of the vehicle 105. The process 400 continues in a block 435.

In the block 435, the vehicle computer 110 actuates one or more vehicle components 125 based on the crosswind risk. That is, the vehicle computer 110 can actuate one or more vehicle components 125 to compensate for the crosswind, e.g., according to a look-up table or the like, as discussed above. For example, the vehicle computer 110 can actuate an HMI, e.g., a speaker, a touchscreen display, etc., including a cue, e.g., an audio and/or visual cue, specifying the crosswind risk. Additionally, or alternatively, the vehicle computer 110 can actuate a steering component 125 and/or a braking component 125 to maintain the vehicle 105 on a planned path. The process 400 continues in a block 440.

In the block 440, the vehicle computer 110 can then provide the real-time wind data and the crosswind risk to the remote server computer. For example, the vehicle computer 110 can transmit, via the network 135, the real-time wind data and the crosswind risk to the remote server computer 140. The remote server computer 140 can then update the stored wind data based on the real-time wind data and the crosswind risk, as discussed above. The process 400 ends following the block 440.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a first computer including a processor and a memory, the memory storing instructions executable by the processor to:
   determine real-time wind data for a location based on a detected movement of an object relative to a vehicle, wherein the real-time wind data includes a wind speed and a wind direction;
   receive stored wind data for the location from a remote computer;
   determine that the real-wind data represents a crosswind based on a probability for crosswind being greater than a threshold;
   upon determining that the real-wind data represents the crosswind, determine a crosswind risk based on the real-time wind data and the stored wind data; and
   actuate a vehicle component to compensate for the crosswind risk.

2. The system of claim 1, wherein the instructions further include instructions to provide the crosswind risk and the real-time wind data to the remote computer.

3. The system of claim 2, wherein the remote computer includes a second processor and a second memory, the second memory storing instructions executable by the second processor to update the stored wind data based on the crosswind risk and the real-time wind data.

4. The system of claim 1, wherein the instructions further include instructions to input sensor data obtained by one or more sensors on the vehicle to a machine learning program and to obtain the real-time wind data as output from the machine learning program.

5. The system of claim 1, wherein the instructions further include instructions to determine the real-time wind data additionally based on weather data for an area, wherein the location is within the area.

6. The system of claim 1, wherein the instructions further include instructions to determine the real-time wind data additionally based on steering data for the vehicle.

7. The system of claim 1, wherein the instructions further include instructions to determine the crosswind risk additionally based on a speed of the vehicle.

8. The system of claim 1, wherein the instructions further include instructions to determine the real-time wind data additionally based on an orientation of the object relative to a ground surface.

9. The system of claim 1, wherein the instructions further include instructions to provide location data of the vehicle to the remote computer.

10. The system of claim 1, wherein the instructions further include instructions to determine movement of the object based on optical flow imaging.

11. A method, comprising:
    determining real-time wind data for a location based on a detected movement of an object relative to a vehicle, wherein the real-time wind data includes a wind speed and a wind direction;
    receiving stored wind data for the location from a remote computer;
    determining that the real-wind data represents a crosswind based on a probability for crosswind being greater than a threshold;
    upon determining that the real-wind data represents the crosswind, determining a crosswind risk based on the real-time wind data and the stored wind data; and
    actuating a vehicle component to compensate for the crosswind risk.

12. The method of claim 10, further comprising providing the crosswind risk and the real-time wind data to the remote computer.

13. The method of claim 12, further comprising updating, in the remote computer, the stored wind data based on the crosswind risk and the real-time wind data.

14. The method of claim 10, further comprising inputting image data obtained by one or more sensors on the vehicle to a machine learning program and to obtain the real-time wind data as output from the machine learning program.

15. The method of claim 10, further comprising determining the real-time wind data additionally based on weather data for an area, wherein the location is within the area.

16. The method of claim 10, further comprising determining the real-time wind data additionally based on steering data for the vehicle.

17. The method of claim 10, further comprising determining the crosswind risk additionally based on a speed of the vehicle.

18. The method of claim 10, further comprising determining the real-time wind data additionally based on an orientation of the object relative to a ground surface.

19. The method of claim 10, further comprising providing location data of the vehicle to the remote computer.

20. The method of claim 10, further comprising determining movement of the object based on optical flow imaging.

\* \* \* \* \*